(12) United States Patent
Coggan et al.

(10) Patent No.: US 8,807,697 B2
(45) Date of Patent: Aug. 19, 2014

(54) ENCAPSULATED REACTIVE INK AND METHOD FOR FORMING IMAGES USING SAME

(75) Inventors: Jennifer Alice Coggan, Kitchener (CA); Michelle N. Chrétien, Mississauga (CA); James D. Mayo, Mississauga (CA); Peter G. Odell, Mississauga (CA); Jennifer L. Belelie, Oakville (CA)

(73) Assignee: Xerox Corporation, Norwalk, CT (US)

( * ) Notice: Subject to any disclaimer, the term of this patent is extended or adjusted under 35 U.S.C. 154(b) by 800 days.

(21) Appl. No.: 12/947,041

(22) Filed: Nov. 16, 2010

(65) Prior Publication Data

US 2012/0120146 A1 May 17, 2012

(51) Int. Cl.
*B41J 2/15* (2006.01)
*B41J 2/17* (2006.01)
*C09D 11/10* (2014.01)

(52) U.S. Cl.
CPC .................................. *C09D 11/101* (2013.01)
USPC ............................................ 347/20; 347/95

(58) Field of Classification Search
USPC ..................................... 347/20, 96; 523/160
See application file for complete search history.

(56) References Cited

U.S. PATENT DOCUMENTS

| | | | |
|---|---|---|---|
| 4,251,824 A | 2/1981 | Hara et al. | |
| 4,410,899 A | 10/1983 | Haruta et al. | |
| 4,412,224 A | 10/1983 | Sugitani | |
| 4,490,731 A | 12/1984 | Vaught | |
| 4,532,530 A | 7/1985 | Hawkins | |
| 4,601,777 A | 7/1986 | Hawkins et al. | |
| 5,354,840 A | 10/1994 | Odell | |
| 5,372,852 A | 12/1994 | Titterington et al. | |
| 5,380,769 A | 1/1995 | Titterington et al. | |
| 5,645,888 A | 7/1997 | Titterington et al. | |
| 5,958,169 A | 9/1999 | Titterington et al. | |
| 6,114,076 A | 9/2000 | Odell et al. | |
| 6,352,805 B1 | 3/2002 | Taylor et al. | |
| 6,547,380 B2 | 4/2003 | Smith et al. | |
| 7,259,275 B2 | 8/2007 | Belelie et al. | |
| 7,276,614 B2 | 10/2007 | Belelie et al. | |
| 7,699,918 B2 | 4/2010 | Odell et al. | |
| 2005/0256224 A1* | 11/2005 | Miyata et al. ................ 523/160 |
| 2008/0000384 A1 | 1/2008 | Belelie et al. | |
| 2008/0295731 A1 | 12/2008 | Odell et al. | |
| 2011/0070372 A1 | 3/2011 | Faucher et al. | |

OTHER PUBLICATIONS

Achilias and Sideridou, Kinetics of Benzoyl Peroxide/Amine Initiated Free Radical Polymerization of Dental Dimethacrylate Monomers: Experimental Modeling Studies for TEDGMA and Bis-EMA, Macromolecules, vol. 37, No. 11, 2004, pp. 4254-4265.
Elliott, Lovell, and Bowman, Primary Cyclization in the Polymerization of Bis-GMA and TEGDMA: a modeling approach to understanding the cure of dental resins, Dental Materials 17 (2001), pp. 221-229.
Sideridou, Achilias, and Karava, Reactivity of Benzoyl Peroxide/Amine System as an Initiator for the Free Radical Polymerization of Dental and Orthopaedic Dimetharcylate Monomers: Effect of the Amine and Monomer Structures, Macromolecules 39, 2006, pp. 2071-2080.
Achilias and Sideridou, Study of the Effect of Two BPO/Amine Initiating Systems on the Free-Radical Polymerization of MMA Used In Dental Resins and Bone Cements, J. Macromol. Sci., A39, 2002, pp. 1435-1450.
L. Horner, Zur Umsetzung von Diacylperoxyden mit terliaren Aminen, J. Polym. Sci., vol. 18, 1955, pp. 438-439.
Feng, The Role of Amine in Vinyl Radical Polymerization, Makromol. Chem., Macromol. Symp., 63, 1992, pp. 1-18.
Moad, Rizzardo, and Solomon, The Reaction of Acyl Peroxides with 2,2,6,6-Tetramethylpiperidinyl-1-oxy, Tetrahedron Letters, vol. 22, 1981, pp. 1165-1168.
Pastine, Okawa, Zettl, and Frechet, Chemicals On Demand With Phototriggerable Microcapsules, J. Am. Chem. Soc. 2009, 131, pp. 13586-13587.

* cited by examiner

*Primary Examiner* — Uyen Chau N Le
*Assistant Examiner* — Hoang Tran
(74) *Attorney, Agent, or Firm* — Marylou J. Lavoie

(57) ABSTRACT

An ink including at least one first reactive component, at least one second component comprising a triggerable component, at least one third reactive component, and an optional colorant; wherein the at least one first reactive component and the at least one third reactive component are capable of reacting with one another to form a solid ink on a substrate; wherein the at least one first reactive component is encapsulated in a microcapsule; wherein the ink can be jetted onto a substrate and treated whereby the treatment causes the at least one triggerable component to trigger the rupture of the microcapsule thereby releasing the at least one first reactive component from the microcapsule so that the at least one first reactive component and the at least one third reactive component come into contact, react, and polymerize thereby curing the ink.

20 Claims, No Drawings

ENCAPSULATED REACTIVE INK AND METHOD FOR FORMING IMAGES USING SAME

TECHNICAL FIELD

Described herein are inks that may be used in a number of copying and printing devices. More particularly, described herein are inks having at least one first reactive component, at least one second triggerable component, at least one third reactive component, and an optional colorant; wherein the at least one first reactive component and the at least one third reactive component are capable of reacting with one another to form a solid ink on a substrate; and wherein the at least one first reactive component and the at least one second triggerable component are encapsulated in a microcapsule; wherein the ink can be jetted onto a substrate and treated so as to trigger the rupture of the microcapsule and the release of the at least one first reactive component from the microcapsule so that the at least one first reactive component and the at least one second reactive component come into contact, react, and polymerize thereby curing the ink, methods of making such inks, and methods of using such inks.

BACKGROUND

Ink jetting devices are known in the art, and thus extensive description of such devices is not required herein. As described in U.S. Pat. No. 6,547,380, which is hereby incorporated by reference herein in its entirety, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing wherein an acoustic beam exerts a radiation pressure against objects upon which it impinges. Thus, when an acoustic beam impinges on a free surface such as at the liquid/air interface of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, which is hereby incorporated by reference herein in its entirety, the image is applied by jetting appropriately colored inks during four to eighteen rotations (incremental movements) of a substrate (an image receiving member or intermediate transfer member) with respect to the ink jetting head, i.e., there is a small translation of the print head with respect to the substrate in between each rotation. This approach simplifies the print head design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Thermal ink jet processes are well known and are described, for example, in U.S. Pat. Nos. 4,601,777, 4,251,824, 4,410,899, 4,412,224 and 4,532,530, the disclosures of each of which are hereby totally incorporated herein.

Ink jet printing processes may employ inks that are solid at room temperature and liquid at elevated temperatures. Such inks may be referred to as hot melt inks or phase change inks. For example, U.S. Pat. No. 4,490,731, which is hereby incorporated by reference herein in its entirety, discloses an apparatus for dispensing solid ink for printing on a substrate such as paper. In thermal ink jet printing processes employing hot melt inks, the solid ink is melted by the heater in the printing apparatus and utilized (i.e., jetted) as a liquid in a manner similar to that of conventional thermal ink jet printing. Upon contact with the printing substrate, the molten ink solidifies rapidly, enabling the colorant to substantially remain on the surface of the substrate instead of being carried into the substrate (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

Xerographic and ink jet print image permanence can be affected negatively in the office environment such as by common water spills, fingerprints, heat and abrasion. In order to improve print image permanence, a coating is often applied over the print. Such overcoats can be solvent or aqueous based and curable or non-curable. Curable inks have been developed to provide robust images with improved image permanence. Ultra-violet curable inks and overcoats have been developed to form extremely robust images. With this type of ink technology, the printed ink itself can be made tougher by cross-linking the ink on and optionally within the substrate (such as paper).

U.S. Pat. Nos. 7,276,614 and 7,259,275, which are each hereby totally incorporated by reference herein in their entireties, disclose ultraviolet curable compounds that are soluble in phase change ink carriers and can be incorporated into the phase change ink without adversely affecting the viscosity characteristics of the ink at desired jetting temperatures.

U.S. Patent Publication Number 20080000384, which is hereby incorporated by reference herein in its entirety, discloses a radiation curable phase change ink comprising an ink vehicle that includes at least one curable carrier, at least one gellant, at least one curable wax, and at least one photoinitiator. In a method of forming an image with the ink, the radiation curable phase change ink is melted, then jetted onto an image receiving substrate, wherein the radiation curable phase change ink forms a gel state, exposed to ultraviolet light to cure the curable components of the radiation curable phase change ink. The wax cures into the structure of the ink, thereby generating a robust image of excellent gloss.

Current solid ink jet formulations can provide vibrant prints and can be used with reliable printers. However, certain wax based images can lack robustness and can scratch or mar when stressed. Ultraviolet curable inks can be ink jet compatible and can offer extremely robust images. However, certain ultraviolet curable inks can require bulky, complex ultraviolet light curing stations and expensive photoinitiators. Reactive inks can be cured without photoinitiators using electron beam irradiation. However, certain electron beam systems can cost many times more than the cost of ultraviolet curing systems and can further require effective shielding. Two-part reactive inks have been proposed that encompass incorporating one component in an ink and a second component in a drum release oil or in a second coincident ink. These two part reactive ink systems can be suitable for their intended purposes. However, such systems can fail due to mass transport and concentration limitations.

U.S. Pat. No. 7,699,918, which is hereby incorporated by reference herein in its entirety, describes a reactive ink set including three mixtures of radically polymerizable monomers. The ink set includes a first mixture including a peroxide, a second mixture including a peroxide decomposition agent, and an optional third mixture that does not include a peroxide or a peroxide decomposition agent. The first mixture and the second mixture polymerize to form a solid ink on the substrate following jetting in the liquid state.

U.S. Pat. No. 5,354,840, which is hereby incorporated by reference herein in its entirety, discloses functional-amine polyesters having at least a first residue of a first monomer, a second residue of a second monomer, and from about 0.1 to about 3.0 mole percent of a functional-amine residue of a functional amine prepared by reacting the first and second monomers and the functional amine in an inert atmosphere. The functional amine has a functional group which facilitates polymerizing the amine and the first and second monomers. The amine residue facilitates reaction of the functional-amine polyester in an organic peroxide cross-linking reaction system.

U.S. Pat. Nos. 5,380,769, 5,645,888, and 5,958,169, which are hereby incorporated by reference herein in their entireties, disclose reactive ink compositions that utilize at least two reactive components, a base ink component and a curing component, that are applied to a receiving substrate separately. The base ink component includes an ink carrier, a compatible colorant, and a cross-linkable constituent, and the curing component is a cross-linking agent. Upon exposure of the base ink component to the curing component, at least a portion of the ink is cross-linked to provide a printed image that is durable and abrasion-resistant U.S. Pat. No. 6,114,076, which is hereby incorporated by reference herein in its entirety, discloses a reactive melt mixing process for the preparation of a low fix temperature toner resin. The process includes (a) mixing a reactive base resin, an initiator, and a polyester with amine functionality, and (b) crosslinking the resulting polymer melt under high shear to form a crosslinked toner resin.

While these technologies are suitable for their intended purposes, there remains a need in large scale production and home and office printing for an improved ink system that can provide robust, scratch, and mar resistant images that are inexpensive and efficiently produced. Further, there is a need for fast curing reactive inks that can be reliably used with desired print speeds. Further, there is a need for ink jet compatible inks that do not require bulky, complex curing stations and expensive photoinitiators. Further, there is a need for fast curing reactive inks that can be used safely and cost effectively. Further, there is a need for fast curing reactive inks that can be used efficiently in ink jet print heads.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is an ink including at least one first reactive component, at least one second component comprising a triggerable component, at least one third reactive component, and an optional colorant; wherein the at least one first reactive component and the at least one third reactive component are capable of reacting with one another to form a solid ink on a substrate; wherein the at least one first reactive component is encapsulated in a microcapsule; wherein the ink can be jetted onto a substrate and treated whereby the treatment causes the at least one triggerable component to trigger the rupture of the microcapsule thereby releasing the at least one first reactive component from the microcapsule so that the at least one first reactive component and the at least one third reactive component come into contact, react, and polymerize thereby curing the ink.

Also described is a method of forming an image with an ink comprising at least one first component, at least one second component comprising a triggerable component, at least one third component, and an optional colorant; wherein the at least one first component and the at least one third component are capable of reacting with one another to form a solid ink on a substrate; wherein the at least one first component is encapsulated in a microcapsule, the method comprising providing the ink to an ink jet device with an ink jet print head; jetting the ink onto a substrate in a desire pattern; treating the jetted ink on the substrate so as to trigger the at least one triggerable component and cause the rupture of the microcapsule and the release of the at least one first component from the microcapsule so that the at least one first component and the at least one third component come into contact, react, and polymerize thereby curing the ink on the substrate.

Also described is an ink jet system comprising an ink comprising at least one first reactive component, at least one second component comprising a triggerable component, at least one third reactive component, and an optional colorant; wherein the at least one first reactive component and the at least one third reactive component are capable of reacting with one another to form a solid ink on a substrate; wherein the at least one first reactive component is encapsulated in a microcapsule and wherein the at least one triggerable component is optionally encapsulated in the microcapsule; wherein the ink can be jetted onto a substrate and treated whereby the treatment causes the at least one triggerable component to trigger the rupture of the microcapsule thereby releasing the at least one first reactive component from the microcapsule so that the at least one first reactive component and the at least one third reactive component come into contact, react, and polymerize thereby curing the ink; and an ink jet device including at least one channel, wherein the ink can be located in the at least one channel and wherein the ink is jettable from an ink jet print head of the ink jet device.

DETAILED DESCRIPTION

An ink is described comprising at least one first reactive component, at least one second component comprising a triggerable component, at least one third reactive component, and an optional colorant; wherein the at least one first reactive component and the at least one third reactive component are capable of reacting with one another to form a solid ink on a substrate; wherein the at least one first reactive component and, optionally, the at least one triggerable component are encapsulated in a microcapsule; wherein the ink can be jetted onto a substrate and treated whereby the treatment causes the at least one triggerable component to trigger the rupture of the microcapsule thereby releasing the at least one first reactive component from the microcapsule so that the at least one first reactive component and the at least one third reactive component come into contact, react, and polymerize thereby curing the ink.

In embodiments, the inks and methods herein provide a fast curing material based on free radical chemistry, for example, promoted systems such as peroxide-amine or peroxide-metal naphthanates, epoxy-amine, isocyanate-polyol, silane-polyol, hydrogen peroxide—ferrous iron; or cationic polymerization wherein vinyl compound polymerization is catalyzed by Lewis acids such as $AlCl_3$, $TiCl_4$, or acetyl perchlorate; or group transfer polymerization wherein (meth) acrylate polymerization is catalyzed by tris(dimethylamino) sulfonium salts, or any other suitable or desired chemistry that is compatible with the microcapsule process, that, in embodiments, cures in seconds and that is suitable for a variety of applications including reactive overcoats, reactive ink jet printing, reaction injection molding, adhesives, and micro-particle synthesis and encapsulation. The inks are easily employed in printing devices having built-in microfluidic devices in the print-head. The hard, solid ink herein can form images on a substrate which images can be robust and can withstand stress from scratching and marring. In embodiments, the hard solid material can be an ink image, a colored ink image, an overcoat, or an undercoat.

In embodiments, the present disclosure encompasses use of reactive ink chemistries including at least two reactive portions, with a first reactive portion (in embodiments, the at least one first reactive component) being encapsulated in a triggerable microcapsule containing the at least one first reactive portion and the at least one triggerable component, for example a phototriggerable component, and a second reactive portion (in embodiments, the at least one third reactive component) that is not encapsulated. The microcapsules, then, can contain within their liquid core a first reactive component and, optionally, a triggerable species, such as a photoactive species, a thermally active species, or an optothermally active species, which can rapidly heat up the liquid content when irradiated. Irradiation of the microcapsule can then trigger a rupture mechanism involving an increase in internal pressure of the microcapsule. The rupture mechanism can occur rapidly. In embodiments, the rupture of the microcapsule can occur within about 0.000005 to about 5, or about 0.0005 to about 0.5, or about 0.005 to about 0.1 seconds of the irradiation treatment. In embodiments, the rupture mechanism can occur without about 0.02 second of irradiation of the ink. Alternately, the triggerable species can reside within the microcapsule walls.

The microcapsules can be designed to rupture at any suitable or desired temperature. In embodiments, the microcapsules can rupture at a temperature of from about 20 to about 220° C., or from about 60 to about 200° C., or from about 120 to about 190° C. In embodiments, the microcapsules can rupture at a temperature of about 171° C.

The microcapsules can be designed to rupture at any suitable or desired irradiation wavelength. In embodiments, the microcapsules can rupture when treated with an irradiation wavelength of from about 200 to about 1200 nanometers, or from about 280 to about 400 nanometers, or from about 320 to about 380 nanometers. In embodiments, the microcapsules can rupture when treated with a wavelength of about 350 nanometers.

The microcapsules can be designed to rupture at any suitable or desired combination of light and heat irradiation. In embodiments, the microcapsules can be designed to rupture when treated optothermally. In embodiments, treating the jetted ink on the substrate comprises irradiating with light, irradiating with heat, irradiating optothermally, or a combination thereof.

Thus, the first and second reactive portions (for example, the first reactive component and the third reactive component) are contained within the same mixture or bulk solution but separated therein so that they cannot react until a triggering event triggers the release of the contents of the microcapsule at a desired time. Once the mixture or bulk solution (the ink) has been jetted onto a substrate, a light source (or other triggering event) triggers the release of the contents of the microcapsule and the two separated reactive components rapidly polymerize thereby curing the ink on the substrate. Thus, the ink system and method provides for the passivation of the two reactive components so that they are not in contact with one another until the microcapsules are ruptured by the appropriate external source, thereby assuring that polymerization occurs only on the substrate and not in the print head.

The system and method herein can comprise any suitable or desired alternate configuration. For example, in embodiments, an ink herein can comprise a single ink jettable solution comprising at least one first reactive component, at least one second component comprising a triggerable component, at least one third reactive component, and an optional colorant; wherein the at least one first reactive component and the at least one third reactive component are capable of reacting with one another to form a solid ink on a substrate; wherein the at least one first reactive component is encapsulated in a microcapsule, and wherein the at least one triggerable component resides within the capsule walls and, optionally, within the capsule contents, and the at least one third reactive component resides within the jettable solution but outside of the microcapsule; wherein the ink can be jetted onto a substrate and treated whereby the treatment causes the at least one triggerable component to trigger the rupture of the microcapsule thereby releasing the at least one first component from the microcapsule so that the at least one first reactive component and the at least one third reactive component come into contact, react, and polymerize thereby curing the ink. In embodiments, the present ink system and method includes wherein the at least one first reactive component and the at least one triggerable component are encapsulated in the microcapsule. Any further suitable or desired configuration is contemplated as within the scope of the present disclosure, including, for example, a system and method wherein the at least one first reactive component and at least on third reactive component are interchanged, for example, wherein the at least one first reactive component resides outside of the microcapsule and the at least one third reactive component is encapsulated within a microcapsule alone or in combination with the at least one triggerable component.

Further embodiments contemplated herein include an ink wherein the at least one first reactive component is encapsulated within a first microcapsule containing at least one triggerable component; wherein the at least one third reactive component is encapsulated within a second microcapsule containing at least one triggerable component; wherein the at least one triggerable component in the first microcapsule and the at least one triggerable component in the second microcapsule are the same or different; wherein the at least one triggerable component in the first microcapsule is encapsulated in the first microcapsule or resides within the walls of the first microcapsule; and wherein the at least one triggerable component in the second microcapsule is encapsulated in the second microcapsule or resides within the walls of the second microcapsule. In embodiments, upon treating and rupture of the microcapsules, the first reactive component and third reactive component are released and flow from their respective capsules, diffusing to contact one another and react to initiate polymerization of the monomer. For example, such embodiments can include those wherein the reactive component is an initiator. Advantageously, if capsule leakage were encountered, such embodiments would help to slow down or prevent premature reaction as both reactants are residing within separate capsules which serve as a barrier and further have a monomer fluid in between the separate capsules; that is, the first and third reactive components residing within their respective capsules and monomer residing in the bulk ink solution outside of the distinct capsules containing the separated components. Further, such embodiments contemplate selecting microcapsules which are the same or different in capsule wall material content, capsule configuration, and capsule triggerable component. In embodiments, two (or more) distinct types of capsules can be employed to contain the first and third (or more) reactive components thereby separating same. The distinct capsules can be triggered by the same or similar triggerable components. Alternately, different triggerable components can be employed in the distinct capsules which can be triggered all at once or separately, as desired.

In embodiments, the present method of forming an image with an ink comprising at least one first reactive component, at least one second component comprising a triggerable component, at least one third reactive component, and an optional colorant; wherein the at least one first reactive component and the at least one third reactive component are capable of reacting with one another to form a solid ink on a substrate; wherein the at least one first reactive component and the at least one triggerable component are encapsulated within a microcapsule, and wherein the at least one third reactive component resides outside of the microcapsule, the method comprising providing the ink to an ink jet device with an ink jet print head; jetting the ink onto a substrate in a desire pattern; treating the jetted ink on the substrate so as to trigger the at least one triggerable component and cause the rupture of the microcapsule and the release of the at least one first reactive component from the microcapsule so that the at least one first reactive component and the at least one third reactive component come into contact, react, and polymerize thereby curing the ink on the substrate. Thus, the first and third reactive components can be separated in the bulk ink solution by any suitable or desired configuration. Further, the at least one triggerable component can be contained within the microcapsule or can reside in the bulk solution outside of the microcapsule.

In embodiments, the at least one first reactive component, the at least one second triggerable component, the at least one third reactive component, the optional colorant, and any optional ink additives or components, are provided in a single ink jettable solution. When contained in a bulk solution, the ink bulk solution can comprise any suitable or desired material. In embodiments, the microcapsule and the at least one third component are contained in a liquid selected from the group consisting of acrylates, methacrylates, vinyl ether, styrenic compounds, epoxy compounds, and combinations thereof.

The at least one first reactive component can comprise any suitable or desired material. In embodiments, the at least one first reactive component is selected from the group consisting of organic peroxide, epoxide, vinyl ether, polyol, Lewis acid, or sulfonium salt, more particularly tris(disubstituted amino) sulfonium perfluoroalkoxides such as tris(dimethylamino) sulfonium salt.

The at least one third reactive component can comprise any suitable or desired material. In embodiments, the at least one third reactive component is selected from the group consisting of amine, metal naphthanate, polyol, or ferrous iron.

The components including the first and second reactive portions and the material or materials comprising the bulk solution are any suitable or desired materials selected for reactivity and compatibility with one another. For example, in embodiments, the microcapsule can contain a capsule component (first reactive component) and the host fluid can contain a third reactive component selected as in Table 1.

TABLE 1

| Capsule Content (First reactive component) | Host Fluid (Bulk Solution/third reactive component) |
| --- | --- |
| Organic peroxide | amine, styrene, (meth)acrylate |
| Organic peroxide | Metal naphthalate, styrene, (meth)acrylate |
| epoxide, vinyl ether | amine |
| Polyol | isocyanate |
| Polyol | silane |
| Lewis acid, e.g. AlCl$_3$ | Styrene, vinyl ether |
| tris(dimethylamino)sulfonium salt | acrylate, methacrylate |

In embodiments, the ink comprises a mixture or bulk solution that is jetted in the liquid state. In embodiments, the ink has an ink viscosity that is suitable for jetting from an ink jet printer, typically about 10 centipoise at jetting temperature, and can be printed, such as jetted, onto a substrate. A trigger, such as a light source, triggers the release of the contents of the microcapsule, including the first reactive portion, whereby the first reactive portion and the second reactive portion can react, in embodiments rapidly polymerizing thereby curing the ink.

The microcapsule can be any suitable or desired material capable of containing the selected at least one first reactive component and the triggerable component and capable of releasing the first component when exposed to a triggering treatment, such as irradiation with light. The microcapsule has impermeable walls that can contain the at least one first component and the second at least one triggerable component, to allow the at least one first component to reside in a single mixture or solution with the at least one third reactive component without reacting until the microcapsule is triggered, thereby rupturing the walls of the microcapsule and releasing the at least one first component.

The microcapsule can comprise any suitable or desired material. In embodiments, the microcapsule comprises a polyamide.

The microcapsule can comprise any suitable or desired geometrical configuration. In embodiments, the microcapsule is spherical or tubular shaped.

The microcapsule can be any suitable or desired size. In embodiments, the microcapsule is compatible with and capable of being jetted in ink jet printing systems. In embodiments, the microcapsules have a volume average diameter of from about 20 to about 400 nanometers, or from about 30 to about 200 nanometers. In certain embodiments, the microcapsules have a volume average diameter of from about 40 to about 140 nanometers.

In embodiments, the microcapsules can be triggered to release their contents by use of any suitable or desired treatment, including, but not limited to, triggering by exposure to light, heat, or a combination thereof.

When triggered by a suitable treatment, the microcapsules release their contents, allowing the at least one first component to come into contact with and react with the at least one third component. In embodiments, the microcapsules can be phototriggerable, thermotriggerable, optothermally triggerable, or a combination thereof. In embodiments, the at least one first component is encapsulated in a phototriggerable microcapsule, a thermotriggerable microcapsule, or an optothermally triggerable microcapsule.

The microcapsules can be prepared by any suitable or desired method. For example, the microcapsules can be prepared by dissolving a partially hydrolyzed (80-90%) polyvinyl alcohol (PVA) in water to a concentration of from about 0.2 to about 1.5 weight %, preparing a separate suspension of carbon nanotubes (CNT) at about 2 weight % in an acid chlorides, for example, selected from terephthaloyl chloride, succinoyl chloride, adipoyl chloride, dimer dicarboxoyl chloride, oxaloyl chloride, glutaroyl chloride, suberoyl chloride acid, azelaoyl chloride, sebacoyl chloride, isophthaloyl chloride, napthalene-2,6-dicarboxoyl chloride, naphthalene-2,7-dicarboxoyl chloride, cyclohexane dicarboxoyl chloride, and bischloroformates such as 4,4'-isopropylidene-bisphenol bischloroformate, and benzoyl peroxide dissolved an acrylate monomer or optionally inert diluents such as paraffin oil, silicone oil, or mineral spirit, and combining the CNT suspension and the PVA solution and processing same through a high energy mixer such as a rotor-stator mixer, piston homogenizer, ultrasonic probe, or Microfluidizer™. While processing, a solution of diamine selected from diethyl amine, diethylenetriamine, phenylenediamine, can be added to the processing suspension in about a 25 times molar excess over the chloride. After complete addition of the amine, the homogenization energy can be reduced to achieve gentle agitation. After about two hours, the product can be washed through a coarse 5 micron filter with additional water to remove coarse agglomerates and then the encapsulated particles can be isolated by freeze drying. Microcapsules can also be prepared as described in "Chemicals On Demand With Phototriggerable Microcapsules," by Stefan J. Pastine, et al., J. Am. Chem. Soc. 2009, 131, pages 13586-13587. Alternatively, microcapsules can also be prepared as described in "Nanocapsules for self-healing materials," by B. J. Blaiszik et al., Composites Science and Technology 68 (2008), pages 978-986.

The at least one first reactive component can be any suitable or desired material provided that it is capable of being encapsulated in a suitable microcapsule. In embodiments, the at least one first reactive component, the at least one second triggerable component, the at least one third reactive component, and the optional colorant are provided in a single solution. In specific embodiments, the at least one first reactive component, the at least one second triggerable component, the at least one third reactive component, and the optional colorant are provided in a single solution that is capable of being jetted in an ink jet printing device.

The inks herein can comprise any suitable or desired reactive ink chemistry. The at least one first reactive component can be any suitable or desired component that can react with any suitable or desired third reactive component to form a cured ink. For example, a monomer mixture can be prepared and divided into two parts. One part can be loaded with a catalyst (amine) and the other part can be loaded with a thermal free-radical initiator (for example, benzoyl peroxide) that homolytically cleaves at high temperatures (for example, about 100° C.). Either one of the components can be encapsulated by the method described herein while the remaining reactant can remain in the fluid surrounding the microcapsules. Both amine and peroxide can be dissolved in a polymerizable species such as an acrylate. When combined after capsule rupture, the amine catalyzes the homolytic cleavage of the thermal free-radical initiator at low temperatures (for example, less than about 40° C.). This mechanism therefore allows control of reaction onset and permits reactions to be undertaken at lower temperatures then typically practiced with thermal free radical initiators. Lower reaction temperatures permit lower printer drum temperatures that reduce energy consumption per print.

Reactive ink chemistries can also be selected from those described in U.S. Pat. No. 7,699,918, which is hereby incorporated by reference herein in its entirety.

The at least one second triggerable component can be any component that can be contained within a microcapsule and that can trigger the rupture of the microcapsule to release the contents therein. The at least one second triggerable component can be selected for compatibility with any desired mixture or bulk solution. In embodiments, the at least one second triggerable component is selected from the group consisting of carbon nanotubes, carbon black, fullerenes, graphene, polyanilines, stannic oxide, indium oxide, potassium titanate, and mixtures and combinations thereof.

In embodiments, the microcapsules are invisible to the naked eye when printed on a substrate.

The ink components can be provided at any suitable or desired amounts. Component amounts can be selected based on the particular chemistry and materials selected. For example, the at least one first reactive component can be present in any desired or effective amount. In embodiments, the first reactive component can be an initiator or catalyst such that when the first reactive component is combined with the third reactive component, the first reactive component function as initiators or catalyst that triggers a reaction, such as a polymerization, of other ink components. For example, the first reactive component and the third reactive component can function as a redox initiation pair to polymerize a monomer mixture that can be present both within the capsule and outside of the capsule in the bulk ink solution. In such embodiments, the first and third reactive components may comprise a relatively small fraction of the total ink. In embodiments, the at least one first reactive component can be an initiator or catalyst that is present in an amount of from 0.1 to about 15, or about 0.3 to about 10, or about 0.5 to about 5 weight percent based on the total weight of the ink.

Similarly, the at least one second triggerable component can be present in any desired or effective amount. In embodiments, the at least one second triggerable component can be present in an amount of from 0.005 to about 0.5, or about 0.01 to about 0.1, or about 0.2 to about 0.5 weight percent based on the total weight of the ink.

The at least one third reactive component can be present in any desired or effective amount. In embodiments, the at least one third reactive component can be an initiator or catalyst. In embodiments, the at least one third reactive component can be an initiator or catalyst present in an amount of from 0.1 to about 0.5, or about 0.3 to about 10, or about 0.5 to about 5 weight percent based on the total weight of the ink.

Again, component amounts can be selected based on the particular materials and ink chemistry selected. In embodiments, the first reactive component when combined with the third reactive component reacts directly with the third reactive component, to form a product such as a polymer. Similarly, in these embodiments, the at least one first reactive component can be present as a polymerizable species in any desired or effective amount. For example, the first reactive component and the third reactive component can react with one another to form a desired product such as a polymer or cured ink. In such embodiments, the first and third reactive components may comprise a relatively large fraction of the total ink, and specifically may comprise most of the total ink. For example, in certain embodiments, the at least one first reactive component can be present in any suitable or desired amount, such as in an amount of from about 20 to about 80, or about 30 to about 70, or about 40 to about 60 weight percent based on the total weight of the ink.

For embodiments wherein the at least one first reactive component is present as a polymerizable species, the at least one second triggerable component can be present in any desired or effective amount. For example, in such embodiments, the at least one second triggerable component can be present in an amount of from 0.005 to about 0.5, or about 0.01 to about 0.1, or about 0.2 to about 0.5 weight percent based on the total weight of the ink.

In such embodiments, the at least one third reactive component can be present in any desired or effective amount. In embodiments, the at least one third reactive component can be present as an initiator or catalyst in an amount of from 0.1 to about 0.5, or about 0.3 to about 10, or about 0.5 to about 5 weight percent based on the total weight of the ink.

In other embodiments, the first reactive component, when combined with the third reactive component, reacts directly with the third reactive component, to form a product such as a polymer. For example, the at least one first reactive component can be present as a polymerizable species in any desired or effective amount. In embodiments, the at least one first reactive component can be present as a polymerizable species in an amount of from about 20 to about 80, or about 30 to about 70, or about 40 to about 60 weight percent based on the total weight of the ink.

Similarly, in embodiments wherein the first reactive component, when combined with the third reactive component, reacts directly with the third reactive component to form a product, the at least one second triggerable component can be present in any desired or effective amount. In these embodiments, for example, the at least one second triggerable component can be present in an amount of from about 0.005 to about 0.5, or about 0.01 to about 0.1, or about 0.2 to about 0.5 weight percent based on the total weight of the ink.

In embodiments, the at least one third reactive component can be present as a polymerizable species which can be present in any desired or effective amount. In embodiments, the at least one third reactive component can be a polymerizable species present in an amount of from about 20 to about 80, or about 30 to about 70, or about 40 to about 60 weight percent based on the total weight of the ink.

The ink may optionally contain one or more colorants. The optional colorants may be present in any desired or effective amount. For example, the optional colorant can be present in an amount of from about 0.5 to about 20 percent, or from about 1 to about 6 percent based upon the total weight of the ink.

Examples of optional colorants that can be included in the ink include pigments, dyes, mixtures of pigments and dyes, mixtures of pigments, mixtures of dyes, and mixtures and combinations thereof. Any dye or pigment may be selected, provided it is capable of being dispersed or dissolved in the ink and is compatible with the other ink components.

Examples of suitable pigments include, for example, Paliogen Violet 5100 (BASF); Paliogen Violet 5890 (BASF); Heliogen Green L8730 (BASF); Lithol Scarlet D3700 (BASF); SUNFAST® Blue 15:4 (Sun Chemical 249-0592); HOSTAPERM Blue B2G-D (Clariant); Permanent Red P-F7RK; HOSTAPERM Violet BL (Clariant); Lithol Scarlet 4440 (BASF); Bon Red C (Dominion Color Company); Oracet Pink RF (Ciba); Paliogen Red 3871 K (BASF); SUNFAST® Blue 15:3 (Sun Chemical 249-1284); Paliogen Red 3340 (BASF); SUNFAST® Carbazole Violet 23 (Sun Chemical 246-1670); Lithol Fast Scarlet L4300 (BASF); Sunbrite Yellow 17 (Sun Chemical 275-0023); Heliogen Blue L6900, L7020 (BASF); Sunbrite Yellow 74 (Sun Chemical 272-0558); SPECTRA PAC® C Orange 16 (Sun Chemical 276-3016); Heliogen Blue K6902, K6910 (BASF); SUNFAST® Magenta 122 (Sun Chemical 228-0013); Heliogen Blue D6840, D7080 (BASF); Sudan Blue OS (BASF); Neopen Blue FF4012 (BASF); PV Fast Blue B2GO1 (Clariant); Irgalite Blue BCA (Ciba); Paliogen Blue 6470 (BASF); Sudan Orange G (Aldrich); Sudan Orange 220 (BASF); Paliogen Orange 3040 (BASF); Paliogen Yellow 152, 1560 (BASF); Lithol Fast Yellow 0991 K (BASF); Paliotol Yellow 1840 (BASF); Novoperm Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); Hostaperm Pink E 02 (Clariant); Hansa Brilliant Yellow 5GX03 (Clariant); Permanent Yellow GRL 02 (Clariant); Permanent Rubine L6B 05 (Clariant); Fanal Pink D4830 (BASF); Cinquasia Magenta (Du Pont), Paliogen Black L0084 (BASF); Pigment Black K801 (BASF); and carbon blacks such as REGAL 330™ (Cabot), Carbon Black 5250, Carbon Black 5750 (Columbia Chemical), mixtures and combinations thereof and the like.

Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like.

In embodiments, solvent dyes can be used. Example solvent dyes include spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures and combinations thereof and the like.

The ink may further include known optional additives to take advantage of the known functionality associated with such additives. Such additives may include, for example, viscosity modifiers, antioxidants, UV absorbers, gellants, defoamers, slip and leveling agents, pigment dispersants, surfactants, and the like, as well as mixtures and combinations thereof. The optional additives may be contained within the microcapsule or within the mixture or bulk ink solution (that is, outside of the microcapsule with the third reactive component).

Examples of suitable viscosity modifiers include aliphatic ketones, such as stearone, and the like. Further examples of suitable viscosity modifiers include 2-hydroxybenzyl alcohol, 4-hydroxybenzyl alcohol, 4-nitrobenzyl alcohol, 4-hydroxy-3-methoxy benzyl alcohol, 3-methoxy-4-nitrobenzyl alcohol, 2-amino-5-chlorobenzyl alcohol, 2-amino-5-methylbenzyl alcohol, 3-amino-2-methylbenzyl alcohol, 3-amino-4-methyl benzyl alcohol, 2(2-(aminomethyl)phenylthio) benzyl alcohol, 2,4,6-trimethylbenzyl alcohol, 2-amino-2-ethyl-1,3-propanediol, 2-amino-1-phenyl-1,3-propanediol, 2,2-dimethyl-1-phenyl-1,3-propanediol, 2-bromo-2-nitro-1,3-propanediol, 3-tert-butylamino-1,2-propanediol, 1,1-diphenyl-1,2-propanediol, 1,4-dibromo-2,3-butanediol, 2,3-dibromo-1,4-butanediol, 2,3-dibromo-2-butene-1,4-diol, 1,1,2-triphenyl-1,2-ethanediol, 2-naphthalenemethanol, 2-methoxy-1-naphthalenemethanol, decafluoro benzhydrol, 2-methylbenzhydrol, 1-benzene ethanol, 4,4'-isopropylidene bis(2-(2,6-dibromo phenoxy) ethanol), 2,2'-(1,4-phenylenedioxy)diethanol, 2,2-bis(hydroxymethyl)-2,2',2''-nitrolotriethanol, di(trimethylol-propane), 2,amino-3-phenyl-1-propanol, tricyclohexylmethanol, tris(hydroxymethyl)aminomethane succinate, 4,4'-trimethylene bis(1-piperidine ethanol), N-methyl glucamine, xylitol, or mixtures and combinations thereof. When present, the optional viscosity modifier can be present in the ink in any desired or effective amount, such as from about 30 to about 55 percent or from about 35 to about 50 percent based upon the total weight of the ink.

Optional antioxidants in the ink may protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX® 1098, available from Ciba-Geigy Corporation), 2,2-bis(4-(2-(3,5-di-tert-butyl-4-hydroxyhydrocinnamoyloxy))ethoxyphenyl) propane (TOPANOL-205®, available from ICI America Corporation), tris(4-tert-butyl-3-hydroxy-2,6-dimethyl benzyl) isocyanurate (CYANOX® 1790, 41,322-4, LTDP, Aldrich D12,840-6), 2,2'-ethylidene bis(4,6-di-tert-butylphenyl) fluoro phosphonite (ETHANOX-398®, available from Ethyl Corporation), tetrakis(2,4-di-tert-butylphenyl)-4,4'-biphenyl diphosphonite (ALDRICH 46,852-5; hardness value 90), pentaerythritol tetrastearate (TCI America #PO739), tributylammonium hypophosphite (Aldrich 42,009-3), 2,6-di-tert-butyl-4-methoxyphenol (Aldrich 25,106-2), 2,4-di-tert-butyl-6-(4-methoxybenzyl) phenol (Aldrich 23,008-1), 4-bromo-2,6-dimethylphenol (Aldrich 34,951-8), 4-bromo-3,5-didimethylphenol (Aldrich B6,420-2), 4-bromo-2-nitrophenol (Aldrich 30,987-7), 4-(diethyl aminomethyl)-2,5-dimethylphenol (Aldrich 14,668-4), 3-dimethylaminophenol (Aldrich D14,400-2), 2-amino-4-tert-amylphenol (Aldrich 41,258-9), 2,6-bis(hydroxymethyl)-p-cresol (Aldrich 22,752-8), 2,2'-methylenediphenol (Aldrich B4,680-8), 5-(diethylamino)-2-nitrosophenol (Aldrich 26,951-4), 2,6-dichloro-4-fluorophenol (Aldrich 28,435-1), 2,6-dibromo fluoro phenol (Aldrich 26,003-7), α-trifluoro-o-creso-1 (Aldrich 21,979-7), 2-bromo-4-fluorophenol (Aldrich 30,246-5), 4-fluorophenol (Aldrich F1,320-7), 4-chlorophenyl-2-chloro-1,1,2-tri-fluoroethyl sulfone (Aldrich 13,823-1), 3,4-difluoro phenylacetic acid (Aldrich 29,043-2), 3-fluorophenylacetic acid (Aldrich 24,804-5), 3,5-difluoro phenylacetic acid (Aldrich 29,044-0), 2-fluorophenylacetic acid (Aldrich 20,894-9), 2,5-bis(trifluoromethyl) benzoic acid (Aldrich 32,527-9), ethyl-2-(4-(4-(trifluoromethyl) phenoxy) phenoxy) propionate (Aldrich 25,074-0), tetrakis (2,4-di-tert-butyl phenyl)-4,4'-biphenyl diphosphonite (Aldrich 46,852-5), 4-tert-amyl phenol (Aldrich 15,384-2), 3-(2H-benzotriazol-2-yl)-4-hydroxy phenethyl alcohol (Aldrich 43,071-4), NAUGARD® 76, NAUGARD® 445, NAUGARD® 512, and NAUGARD® 524 (commercially available from Crompton Corporation, Middlebury, Conn.), and the like, as well as mixtures and combinations thereof. The antioxidant, when present, may be present in the ink in any desired or effective amount, such as from about 0.25 percent to about 10 percent by weight of the ink or from about 1 percent to about 5 percent by weight of the ink.

The optional antioxidants may include an antioxidant stabilizer to protect the images from oxidation and may also protect the ink components from oxidation. Specific examples of suitable antioxidant stabilizers include NAUGARD® 524, NAUGARD® 635, NAUGARD® A, NAUGARD® 1-403, NAUGARD® 959, NAUGARD® 76, NAUGARD® 445, and NAUGARD® 512 commercially available from Crompton Corporation, and mixtures and combinations thereof.

The inks can also optionally contain a UV absorber. The optional UV absorbers primarily protect the generated images from UV degradation. Specific examples of suitable UV absorbers include 2-bromo-2',4-dimethoxyacetophenone (Aldrich 19,948-6), 2-bromo-2',5'-dimethoxyacetophenone (Aldrich 10,458-2), 2-bromo-3'-nitroacetophenone (Aldrich 34,421-4), 2-bromo-4'-nitroacetophenone (Aldrich 24,561-5), 3',5'-diacetoxyacetophenone (Aldrich 11,738-2), 2-phenylsulfonyl acetophenone (Aldrich 34,150-3), 3'-aminoacetophenone (Aldrich 13,935-1), 4'-aminoacetophenone (Aldrich A3,800-2), 1H-benzotriazole-1-acetonitrile (Aldrich 46,752-9), 2-(2H-benzotriazol-2-yl)-4,6-di-tert-pentylphenol (Aldrich 42,274-6), 1,1-(1,2-ethane-diyl)bis(3,3,5,5-tetramethylpiperazinone) (commercially available from Goodrich Chemicals), 2,2,4-trimethyl-1,2-hydroquinoline (commercially available from Mobay Chemical), 2-(4-benzoyl-3-hydroxy phenoxy)ethylacrylate, 2-dodecyl-N-(1,2,2,6,6-pentamethyl-4-piperidinyl) succinimide (commercially available from Aldrich Chemical Co., Milwaukee, Wis.), 2,2,6,6-tetramethyl-4-piperidinyl/β-tetramethyl-3,9-(2,4,8,10-tetraoxo spiro(5,5)-undecane) diethyl-1,2,3,4-butane tetracarboxylate (commercially available from Fairmount), N-(p-ethoxycarbonylphenyl)-N'-ethyl-N'-phenylformadine (commercially available from Givaudan), 6-ethoxy-1,2-dihydro-2,2,4-trimethylquinoline (commercially available from Monsanto Chemicals), 2,4,6-tris-(N-1,4-dimethylpentyl-4-phenylenediamino)-1,3,5-triazine (commercially available from Uniroyal), 2-dodecyl-N-(2,2,6,6-tetra-thyl-4-piperidinyl) succinimide (commercially available from Aldrich Chemical Co.), N-(1-acetyl-2,2,6,6-tetramethyl-4-piperidinyl)-2-dodecyl succinimide (commercially available from Aldrich Chemical Co.), (1,2,2,6,6-pentamethyl-4-piperidinyl/β-tetramethyl-3,9-(2,4,8,10-tetra oxo-spiro-(5,5)undecane)diethyl)-1,2,3,4-butane tetracarboxylate (commercially available from Fairmount), (2,2,6,6-tetramethyl-4-piperidinyl)-1,2,3,4-butane tetracarboxylate (commercially available from Fairmount), nickel dibutyl dithio carbamate (commercially available as UV-Chek® AM-105 from Ferro), -amino-2',5-dichlorobenzophenone (Aldrich 10,515-5), 2'-amino-4',5'-dimethoxyacetophenone (Aldrich 32,922-3), 2-benzyl-2-(dimethylamino)-4'-morpholino butyrophenone (Aldrich 40,564-7), 4'-benzyloxy-2'-hydroxy-3'-methylacetophenone (Aldrich 29,884-0), 4,4'-bis(diethylamino) benzophenone (Aldrich 16,032-6), 5-chloro-2-hydroxy benzophenone (Aldrich C4,470-2), 4'-piperazinoacetophenone (Aldrich 13,646-8), 4'-piperidinoacetophenone (Aldrich 11,972-5), 2-amino-5-chlorobenzophenone (Aldrich A4,556-4), 3,6-bis(2-methyl-2-morpholinopropionyl)-9-octylcarbazole (Aldrich 46,073-7), and mixtures and combinations thereof. When present, the optional UV absorber may be present in the ink in any desired or effective amount, such as from about 1 to about 10, or from about 3 to about 5 percent by weight of the ink.

A method of forming an image herein includes forming an image with an ink comprising at least one first reactive component, at least one second component comprising a triggerable component, at least one third reactive component, and an optional colorant; wherein the at least one first component and the at least one third reactive component are capable of reacting with one another; wherein the at least one first reactive component, and optionally, the at least one triggerable component, are encapsulated in a microcapsule, the method comprising providing the ink to an ink jet device with an ink jet print head; jetting the ink onto a substrate in a desired pattern; treating the jetted ink on the substrate so as to trigger the at least one triggerable component and cause the rupture of the microcapsule and the release of the at least one first reactive component from the microcapsule so that the at least one first reactive component and the at least one third reactive component come into contact, react, and polymerize thereby curing the ink on the substrate.

The first reactive component and the third reactive component in the ink come into contact when the microcapsule is treated to trigger the rupture of the microcapsule and the release of the first reactive component contained therein. The first and third reactive components can then combine and react to transform into a hard, solid ink to form a visible image, a clear ink coating, or a hard, solid object such as a molded device, among other applications. If the two or more reactive components combine to form a visible image, at least one ink of the ink set should include a colorant. If the two or more reactive components combine to form a clear ink coating, such as an overcoat, the inks should not contain a colorant. If the two or more reactive components combine to form an undercoat, the inks may optional contain a colorant. In embodiments, the ink herein comprises a clear ink, a colored ink, an overcoat, or an undercoat.

In embodiments, an ink jet system herein comprises an ink comprising at least one first reactive component, at least one second component comprising a triggerable component, at least one third reactive component, and an optional colorant; wherein the at least one first reactive component and the at least one third reactive component are capable of reacting with one another; wherein the at least one first reactive component is encapsulated in a microcapsule; wherein the ink can be jetted onto a substrate and treated so as to trigger the rupture of the microcapsule and the release of the at least one first reactive component from the microcapsule so that the at least one first reactive component and the at least one third reactive component come into contact, react, and polymerize thereby curing the ink; and an ink jet device including at least one channel, wherein the ink can be located in the at least one channel and wherein the ink is jettable from an ink jet print head of the ink jet device.

The inks herein do not require jetting at elevated temperatures. In embodiments, the present ink can be jetted at a temperature of from about 25 to about 85° C., or from about 35 to about 65° C., or from about 40 to about 60° C.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

1.5 g of 88% hydrolyzed polyvinyl alcohol (PVA) is added to 100 milliliters of deionized water and stirred on a magnetic stirrer until dissolved. A separate suspension comprising 30 milligrams of carbon nanotubes (CNT) in a solution of 1.5 grams of succinoyl chloride, 0.6 gram benzoyl peroxide, and 30 grams triethyleneglycol dimethacrylate (TEGDMA) is created. A third solution of 1.8 grams of ethylenediamine in 20 milliliters of deionized water is prepared and transferred to a dropping funnel. The CNT suspension and the PVA solution are combined and processed in a 400 milliliter beaker using an IKA T25 Ultra-Turrax homogenizer and a 25 millimeter diameter probe at 12000 revolutions per minute (RPM) for 4 minutes while adding the diamine solution at about 5 milliliters/minute. The homogenizer probe is removed and the suspension of microcapsules is stirred at about 150 RPM on a magnetic stirrer for a further two hours. The product is washed through a 5 micron filter with an additional 100 milliliters of deionized water to remove coarse agglomerates and then the encapsulated particles are isolated by freeze drying.

Example 2

1.5 grams of 88% hydrolyzed polyvinyl alcohol (PVA) is added to 100 milliliters deionized water and stirred on a magnetic stirrer until dissolved. A separate suspension of 30 milligrams of carbon nanotubes (CNT) in a solution of 2.0 g of terephthaloyl chloride, 8.0 grams cyclohexyl vinyl ether, and 22 grams diglycidyl 1,2-cyclohexanedicarboxylate is created. A third solution of 2.6 grams of diethylenetriamine in 20 milliliters of deionized water is prepared and transferred to a dropping funnel. The CNT suspension and the PVA solution are combined and processed in a 400 milliliter beaker using an IKA T25 Ultra-Turrax homogenizer and a 25 millimeter diameter probe at 12000 RPM for 4 minutes while adding the diamine solution at about 5 milliliters/minute. The homogenizer probe is removed and the suspension of microcapsules is stirred at about 150 RPM on a magnetic stirrer for a further two hours. The product is washed through a 5 micron filter with an additional 100 milliliter of deionized water to remove coarse agglomerates and then the encapsulated particles are isolated by freeze drying.

Example 3

To 35 milliliters of 37 weight % formaldehyde in water are added 5 grams of urea. The mixture is stirred and upon dissolution of the urea, the pH is adjusted to 8 by adding a solution of 10% triethylamine in water dropwise. This solution is stirred for 30 minutes whereupon 30 milligrams of carbon nanotubes are added and the resulting suspension is stirred for a further 30 minutes. Separately, a solution of poly(ethylene-alt-maleic anhydride) (EMA) (2 weight %) in 100 milliliters of water is prepared. A solution of 0.6 grams benzoyl peroxide, 3 grams hexadecane, and 30 grams triethyleneglycol dimethacrylate (TEGDMA) is then added to the EMA solution. The resulting suspension is subjected to sonification using a 750W probe (Fisher Scientific) set at 68% intensity for 5 minutes, while stirring with a magnetic stirrer at about 300 rpm. The formaldehyde-urea CNT suspension is then added and the pH adjusted to 2. The temperature is raised to 55° C. and maintained with stirring for a further three hours. The product is washed through a 5 micron filter with an additional 100 milliliters of deionized water to remove coarse agglomerates and then the encapsulated particles are isolated by freeze drying.

Example 4

The isolated microcapsules of Example 1 (30 grams) are dispersed in 60 grams of triethyleneglycol dimethacrylate (TEGDMA), and N,N-dimethyl-p-toluidine (DMT) (2.0 grams). To this dispersion is slowly added with mixing a cyan pigment dispersion consisting of 15.6 grams propoxylated neopentylglycol diacrylate, 5.6 grams EFKA® 4340 dispersant, 3.07 Sun Spectrapak® C PB 15:4 cyan pigment that previously to addition is attrited for 20 hours. The final mixture is a curable cyan ink that is cured by capsule rupture resulting by exposure to laser light.

Example 5

30 grams of the isolated microcapsules of Example 2 are dispersed in 9.0 grams Jeffamine® D-230 (diamine available from Huntsman), 18 grams nonylphenol, and 1.2 grams aminoethylpiperazine. The final mixture is a curable clear overcoat that is cured by capsule rupture resulting by exposure to laser light.

Example 6

30 grams of the isolated microcapsules of Example 3 are dispersed in 60 grams of triethyleneglycol dimethacrylate (TEGDMA), and 2.0 grams of N,N-dimethyl-p-toluidine (DMT). To this dispersion is slowly added with mixing a cyan pigment dispersion consisting of 15.6 grams propoxylated neopentylglycol diacrylate, 5.6 g EFKA® 4340 dispersant, 3.07 Sun Spectrapak® C PB 15:4 cyan pigment that previously to addition is attrited for 20 hours. The final mixture is a curable cyan ink that is cured by capsule rupture resulting by exposure to laser light.

In embodiments, inks described herein include microcapsules which provide a means to create a versatile reactive ink using any suitable or desired ink chemistry. The microcapsules contain a triggerable component, in embodiments, an optothermally active species. One reactive component of a reactive ink can be encapsulated in the microcapsule along with the triggerable component. This feature enables enhanced jetting performance of the ink. For example, the ink can be jetted without premature reacting of the ink components during jetting due to the encapsulation of one of the reactive components in the microcapsule. After jetting onto a desired substrate, the reactive component contained in the microcapsule is released such as via exposure to radiation of the proper wavelength and intensity sufficient to trigger rupture of the microcapsule, which triggering parameters are selected in accordance with the selected triggerable component, in embodiments, an optothermally active species. The ink can then have the desired properties, in specific embodiments properties providing image robustness to mechanical rubbing, that are difficult or impossible to achieve with non-reactive ink due to constraints in jetting performance. Advantageously, the inks herein do not require jetting at elevated temperatures.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. An ink comprising:
at least one first reactive component, at least one second component comprising a triggerable component, at least one third reactive component, and an optional colorant;
wherein the at least one first reactive component and the at least one third reactive component are capable of reacting with one another to form a solid ink on a substrate;
wherein the at least one first reactive component is encapsulated in a microcapsule;
wherein the ink can be jetted onto a substrate and treated whereby the treatment causes the at least one triggerable component to trigger the rupture of the microcapsule thereby releasing the at least one first reactive component from the microcapsule so that the at least one first reactive component and the at least one third reactive component come into contact, react, and polymerize thereby curing the ink.

2. The ink of claim 1, wherein the at least one first reactive component and the at least one triggerable component are encapsulated in the microcapsule; or
wherein the at least one first reactive component is encapsulated in the microcapsule and the at least one triggerable component resides within walls of the microcapsule.

3. The ink of claim 1, wherein the at least one first reactive component is encapsulated within a first microcapsule containing at least one triggerable component;
wherein the at least one third reactive component is encapsulated within a second microcapsule containing at least one triggerable component;
wherein the at least one triggerable component in the first microcapsule and the at least one triggerable component in the second microcapsule are the same or different;
wherein the at least one triggerable component in the first microcapsule is encapsulated in the first microcapsule or resides within walls of the first microcapsule; and
wherein the at least one triggerable component in the second microcapsule is encapsulated in the second microcapsule or resides within walls of the second microcapsule.

4. The ink of claim 1, wherein the at least one first reactive component, the at least one second triggerable component, the at least one third reactive component, and the optional colorant are provided in a single ink jettable solution.

5. The ink of claim 1, wherein the at least one first reactive component, the at least one second triggerable component, the at least one third reactive component, and the optional colorant are provided in a single ink jettable solution; and
wherein the ink jettable solution comprises at least one of a compound selected from the group consisting of acrylates, methacrylates, vinyl ether, styrenic compounds, and epoxy compounds.

6. The ink of claim 1, wherein the at least one second triggerable component is a phototriggerable component; a thermotriggerable component; or an optothermally triggerable component.

7. The ink of claim 1, wherein the at least one first reactive component is selected from the group consisting of organic peroxide, epoxide, vinyl ether, polyol, Lewis acid, and sulfonium salt.

8. The ink of claim 1, wherein the at least one second triggerable component is selected from the group consisting of carbon nanotubes, carbon black, fullerenes, graphene, polyanilines, stannic oxide, indium oxide, and potassium titanate.

9. The ink of claim 1, wherein the microcapsules have a volume average diameter of from about 20 to about 400 nanometers.

10. The ink of claim 1, wherein the at least one third reactive component is selected from the group consisting of amine, metal naphthanate, polyol, and ferrous iron.

11. The ink of claim 1, wherein the ink is a clear ink, a colored ink, an overcoat, or an undercoat.

12. A method of forming an image with an ink comprising at least one first component, at least one second component comprising a triggerable component, at least one third component, and an optional colorant; wherein the at least one first component and the at least one third component are capable of reacting with one another to form a solid ink on a substrate; wherein the at least one first component is encapsulated in a microcapsule, the method comprising:
providing the ink to an ink jet device with an ink jet print head;
jetting the ink onto a substrate in a desire pattern;
treating the jetted ink on the substrate so as to trigger the at least one triggerable component and cause the rupture of the microcapsule and the release of the at least one first component from the microcapsule so that the at least one first component and the at least one third component come into contact, react, and polymerize thereby curing the ink on the substrate.

13. The method of claim 12, wherein the at least one first reactive component and the at least one triggerable component are encapsulated in the microcapsule.

14. The method of claim 12, wherein the at least one first reactive component is encapsulated in the microcapsule and the at least one triggerable component resides within walls of the microcapsule.

15. The method of claim 12, wherein the at least one first reactive component is encapsulated within a first microcapsule containing at least one triggerable component;
wherein the at least one third reactive component is encapsulated within a second microcapsule containing at least one triggerable component;
wherein the at least one triggerable component in the first microcapsule and the at least one triggerable component in the second microcapsule are the same or different;
wherein the at least one triggerable component in the first microcapsule is encapsulated in the first microcapsule or resides within walls of the first microcapsule; and
wherein the at least one triggerable component in the second microcapsule is encapsulated in the second microcapsule or resides within walls of the second microcapsule.

16. The method of claim 12, wherein the at least one first component, the at least one second triggerable component, the at least one third component, and the optional colorant are provided in a single solution; and
wherein the ink jettable solution comprises at least one of a compound selected from the group consisting of acrylates, methacrylates, vinyl ether, styrenic compounds, and epoxy compounds.

17. The method of claim 12, wherein treating comprises irradiating with light, irradiating with heat, irradiating optothermally, or a combination thereof.

18. The method of claim 12, wherein the at least one second triggerable component is selected from the group consisting of carbon nanotubes, carbon black, fullerenes, graphene, polyanilines, stannic oxide, indium oxide, and potassium titanate.

19. The method of claim 12, wherein the microcapsules have a volume average diameter of from about 20 to about 400 nanometers.

20. An ink jet system comprising:
an ink comprising at least one first reactive component, at least one second component comprising a triggerable component, at least one third reactive component, and an optional colorant; wherein the at least one first reactive component and the at least one third reactive component are capable of reacting with one another to form a solid ink on a substrate; wherein the at least one first reactive component is encapsulated in a microcapsule and wherein the at least one triggerable component is optionally encapsulated in the microcapsule; wherein the ink can be jetted onto a substrate and treated whereby the treatment causes the at least one triggerable component to trigger the rupture of the microcapsule thereby releasing the at least one first reactive component from the microcapsule so that the at least one first reactive component and the at least one third reactive component come into contact, react, and polymerize thereby curing the ink; and
an ink jet device including at least one channel, wherein the ink can be located in the at least one channel and wherein the ink is jettable from an ink jet print head of the ink jet device.

* * * * *